UNITED STATES PATENT OFFICE.

GEORGE W. MATHISON, OF DENVER, COLORADO.

FOOD-PACKAGE.

1,240,235.

Specification of Letters Patent.  Patented Sept. 18, 1917.

No Drawing.  Application filed April 30, 1917.  Serial No. 165,535.

*To all whom it may concern:*

Be it known that I, GEORGE W. MATHISON, a citizen of the United States, and a resident of Denver, in the county of Denver and State of Colorado, have invented a certain new and useful Improvement in Food-Packages, of which the following is a full, clear, and exact description.

My invention is an improvement in food packages and it relates primarily to means for so packing foods of certain character that substitution of other or inferior products may be prevented. Particularly it relates to a package for malted milk and like products, the package being designed to contain merely enough of the article to serve one person with the food or drink adapted to be made therefrom. Manufacturers experience a great deal of difficulty and loss from the acts of druggists and other dispensers of soft drinks substituting for standard, well advertised articles products of inferior grade, particularly through a custom of these dealers of refilling the bottles or other containers in which standard products are marketed with cheaper or imitation makes. My invention, therefore, contemplates the packing of malted milk and similar products in individual containers each holding only enough for the making of a single drink or food service, these containers preferably being of friable, edible composition so that the container may be crushed and mixed in with and form a part of the drink or other food product which is to be compounded. A further advantage arises from the use of such a package in that only a proper amount of the ingredient is added, thus avoiding loss to the retailer through carelessness of his employees in adding unnecessary amounts of any of these products in particular cases.

As previously stated, the container portion of my package shall be of such character that it contributes edible material to mixture and it is preferably formed wholly or partly of the same material as the filler so that it contributes its part to the food or drink to be compounded without materially altering the character thereof. If the filler or body material is of such character as to be moldable when moistened, a small amount of water may simply be added thereto and the molded container baked or merely dried as occasion may demand. Or if the body material will not cohere of itself some further substance, such as white of egg, flour or the like, may be added.

While the containers may be of any desired shape, I prefer to make them cubical in form, on account of the ease with which a package of that shape can be broken. When made in this shape the cube may be molded with one side left open and, after the filling material has been placed in its interior, the package may be closed with a plate of the same material as the container, which end may be secured in place by a minute amount of sealing material, which may be some of the container material in plastic condition.

It will be evident that a container of this character can be made to bear the manufacturer's name and trade-marks and can be readily placed in a transparent dispensing device operated within the view of the customer so that he can be assured he is securing the product of a preferred manufacturer.

Having thus described my invention, what I claim and desire to secure by Letters Patent is:

1. A vending package consisting of a filler of a beverage ingredient material inclosed in a container of friable, edible material, said container being molded of plastic material composed in part of the same substance as said filler.

2. A vending package consisting of a filler of a beverage ingredient material inclosed in a container of friable, edible material, said container being molded of plastic material the base of which is the same substance as said filler.

3. A vending package consisting of a filler of a pulverulent beverage ingredient material inclosed in a container, said container being molded of plastic material the base of which is the same substance as said filler.

4. A vending package consisting of a filler of pulverulent malted milk inclosed in a container of friable material the base of which is malted milk.

In testimony whereof I have hereunto affixed my signature.

GEORGE W. MATHISON.